(12) United States Patent
Boehm et al.

(10) Patent No.: US 7,428,043 B2
(45) Date of Patent: Sep. 23, 2008

(54) APPARATUS FOR ASCERTAINING THE LIGHT POWER LEVEL OF A LIGHT BEAM, AND SCANNING MICROSCOPE

(75) Inventors: Ingo Boehm, Heidelberg (DE); Frank Schreiber, Dossenheim (DE)

(73) Assignee: Leica Microsystems CMS GmbH, Wetzlar (DE)

( * ) Notice: Subject to any disclaimer, the term of this patent is extended or adjusted under 35 U.S.C. 154(b) by 256 days.

(21) Appl. No.: 10/854,987

(22) Filed: May 27, 2004

(65) Prior Publication Data

US 2004/0239929 A1    Dec. 2, 2004

(30) Foreign Application Priority Data

May 30, 2003   (DE)   ................. 103 24 478

(51) Int. Cl.
   *G01J 1/42*    (2006.01)
   *G01J 3/42*    (2006.01)
   *G01J 3/447*   (2006.01)
   *G01J 3/28*    (2006.01)

(52) U.S. Cl. ................ 356/218; 356/322; 356/327

(58) Field of Classification Search ........... 356/218, 356/415–419, 368–369, 305, 285, 216; 250/201.2–201.3
   See application file for complete search history.

(56) References Cited

U.S. PATENT DOCUMENTS

| | | | | |
|---|---|---|---|---|
| 3,636,359 A * | 1/1972 | Hooper | ............... | 250/550 |
| 3,780,296 A * | 12/1973 | Waksberg et al. | ....... | 250/201.1 |
| 4,335,939 A * | 6/1982 | Stovell et al. | .............. | 359/247 |
| 4,842,404 A * | 6/1989 | Duda | ........................ | 356/218 |
| 5,034,679 A * | 7/1991 | Henderson et al. | ........... | 324/96 |
| 5,097,351 A * | 3/1992 | Kramer | ...................... | 359/17 |
| 5,124,993 A * | 6/1992 | Braunlich et al. | ............ | 372/31 |
| 5,127,730 A * | 7/1992 | Brelje et al. | ............... | 356/318 |
| 5,153,667 A * | 10/1992 | Aoshima et al. | ........... | 356/218 |
| 6,011,250 A | 1/2000 | Minakuchi et al. | | |
| 6,114,682 A * | 9/2000 | Minakuchi et al. | .......... | 250/205 |
| 6,307,627 B1 * | 10/2001 | Vurens | ...................... | 356/369 |
| 6,353,216 B1 * | 3/2002 | Oren et al. | .............. | 250/201.3 |
| 6,445,453 B1 * | 9/2002 | Hill | ............................ | 356/450 |
| 6,570,705 B2 * | 5/2003 | Bewersdorf et al. | ........ | 359/388 |
| 6,686,583 B2 * | 2/2004 | Engelhardt | .................. | 250/216 |
| 6,775,426 B2 * | 8/2004 | Ito et al. | ...................... | 385/11 |

(Continued)

FOREIGN PATENT DOCUMENTS

DE    19621802    12/1996

(Continued)

OTHER PUBLICATIONS

J. Brakenhoff, "Imaging Modes in Confocal Scanning Light Microscopy (CSLM)", Journal of Microscopy, vol. 117, Pt 2, Nov. 1979, pp. 233-242.

*Primary Examiner*—L. G. Lauchman
*Assistant Examiner*—Jarreas C Underwood
(74) *Attorney, Agent, or Firm*—Darby & Darby

(57) ABSTRACT

An apparatus for ascertaining properties of a light beam, comprises a means for splitting a measured beam out from the light beam and comprises at least one detector that at least partially receives the measured beam. A polarization-influencing means is arranged in the beam path of the measured beam in order to enhance reliability and reproducibility.

20 Claims, 3 Drawing Sheets

U.S. PATENT DOCUMENTS

| | | | |
|---|---|---|---|
| 6,806,950 B2 * | 10/2004 | Ulrich et al. | 356/218 |
| 2002/0003204 A1 | 1/2002 | Engelhardt | 250/216 |

FOREIGN PATENT DOCUMENTS

| | | |
|---|---|---|
| DE | 19702753 | 7/1998 |
| DE | 19713254 | 10/1998 |
| DE | 19906757 | 12/1999 |
| DE | 10115589 | 12/2001 |
| DE | 10033269 | 1/2002 |
| EP | 0495930 | 4/1999 |

* cited by examiner

APPARATUS FOR ASCERTAINING THE LIGHT POWER LEVEL OF A LIGHT BEAM, AND SCANNING MICROSCOPE

CROSS REFERENCE TO RELATED APPLICATIONS

This application claims priority to German patent application DE 103 24 478.6, the subject matter of which is hereby incorporated by reference herein.

FIELD OF THE INVENTION

The invention concerns an apparatus for ascertaining properties of a light beam.

The invention furthermore concerns a scanning microscope and a confocal scanning microscope.

BACKGROUND OF THE INVENTION

In scanning microscopy, a sample is illuminated with a light beam in order to observe the reflected or fluorescent light emitted from the sample. The focus of an illuminating light beam is moved in a specimen plane by means of a controllable beam deflection device, generally by tilting two mirrors, the deflection axes usually being perpendicular to one another so that one mirror deflects in the X direction and the other in the Y direction. Tilting of the mirrors is brought about, for example, by means of galvanometer positioning elements. The power level of the light coming from the specimen is measured as a function of the position of the scanning beam. The positioning elements are usually equipped with sensors to ascertain the present mirror position.

In confocal scanning microscopy specifically, a specimen is scanned in three dimensions with the focus of a light beam. A confocal scanning microscope generally comprises a light source, a focusing optical system with which the light of the source is focused onto an aperture (called the "excitation pinhole"), a beam splitter, a beam deflection device for beam control, a microscope optical system, a detection pinhole, and the detectors for detecting the detected or fluorescent light. The illuminating light is coupled in, for example, via a beam splitter. The fluorescent or reflected light coming from the specimen travels back through the beam deflection device to the beam splitter, passes through it, and is then focused onto the detection pinhole behind which the detectors are located. Detected light that does not derive directly from the focus region takes a different light path and does not pass through the detection pinhole, so that a point datum is obtained which results, by sequential scanning of the specimen, in a three-dimensional image.

An optical arrangement configured as an acoustooptical component, as known for example from German Unexamined Application DE 199 06 757 A1, can also be provided instead of the beam splitter in order to couple the excitation light of at least one light source into the microscope, and to block out of the light coming from the specimen via the detection beam path the excitation wavelength and the excitation light scattered and reflected at the specimen.

A three-dimensional image is usually achieved by acquiring image data in layers, the path of the scanning light beam on or in the specimen ideally describing a meander (scanning one line in the X direction at a constant Y position, then stopping the X scan and slewing by Y displacement to the next line to be scanned, then scanning that line in the negative X direction at constant Y position, etc.). To make possible acquisition of image data in layers, the sample stage or the objective is shifted after a layer is scanned, and the next layer to be scanned is thus brought into the focal plane of the objective.

A light-guiding fiber is usually used to transport the illuminating light from the light source into a scanning microscope. The polarization direction with which the illuminating light leaves the fiber generally is not constant, but rotates arbitrarily as a function of temperature, the bending of the light-guiding fiber (e.g. because of birefringence), or other external influences. This troublesome effect occurs even in so-called polarization-retaining light-guiding fibers.

Depending on the polarization of the light beam, differing behavior—e.g. in terms of the splitting ratio of the beam splitter or in terms of the amplitude of the light diffracted by the acoustic wave of the acoustooptical component—is exhibited in particular by the beam splitter or by the acoustooptical component that can be used in its stead. The other components of the scanning microscope also exhibit polarization-dependent behavior, so that modifications of the polarization of the illuminating light beam inevitably cause troublesome changes in the light power level at the sample location.

For many applications, samples are prepared with several markers, for example several different fluorescent dyes. These dyes can be excited sequentially, for example using illuminating light beams that have different excitation wavelengths. Simultaneous excitation with one illuminating light beam that contains light of several excitation wavelengths is also common. An arrangement having a single laser emitting multiple laser lines is disclosed, for example, in European Patent Application EP 0 495 930: "Confocal microscope system for multi-color fluorescence." In practical use, such lasers are usually embodied as mixed-gas lasers, in particular as ArKr lasers.

The light power level of the illuminating light is subject to fluctuations over time as a result of various effects, with a negative effect in terms of the examination of samples.

One known method of compensating for short-term fluctuations in, for example, the illuminating light power level is based on dividing a reference beam out of the illuminating beam with a beam splitter, and using the ratio of the measured power levels of the reference and detected light beams for image generation and calculation, so that instantaneous power level fluctuations are eliminated. This is disclosed in G. J. Barkenhoff, Journal of Microscopy, Vol. 117, Pt. 2, November 1979, pp. 233-242. This method has certain disadvantages. For example, retrospectively calculating out the laser power level fluctuations during image calculation is complex, and not always an entirely satisfactory correction method. When a ratio is calculated between the measured power levels of the reference and detected light beams, offset components do not always cancel out. In addition, the calculated scanned image will wash out at locations with very low detected light power levels, since the signal-to-noise ratio no longer allows a color or brightness to be correctly and unequivocally assigned to the scanned image point.

German Unexamined Application DE 100 33 269.2 A1 discloses an apparatus for coupling light into a confocal scanning microscope whose purpose is to compensate for or eliminate these fluctuations in illuminating light power level. The apparatus for coupling in light comprises an optically active component that serves, in particular, to select the wavelength and to adjust the power level of the incoupled light. The apparatus is characterized in that in order to influence the incoupled light, the component serves as the adjustment element of a control system. A disadvantage of this apparatus is that the beam splitter that separates the illuminating light beam path from the detection beam path necessarily has a polarization-dependent and wavelength-dependent reflectivity. The control operation is therefore laborious and complex, and requires laborious calibration measurements.

It is proposed in German Unexamined Application DE 197 02 753 A1 that the power level of the laser radiation coupled into the scanning head, in particular of each individual laser line, be continuously monitored, and that fluctuations at the laser be compensated for directly or with a downstream intensity modulator (ASOM, AOTF, EOM, shutter). The beam splitter problem just explained is relevant to this disclosure as well.

SUMMARY OF THE INVENTION

It is an object of the present invention to provide an apparatus that makes possible reliable and reproducible monitoring of the properties, in particular the polarization state, of a light beam.

The present invention provides an apparatus comprising:
a means for splitting a measured beam out from the light beam, at least one detector that at least partially receives the measured beam, and a polarization-influencing means in the beam path of the measured beam.

It is also an object of the present invention to provide a scanning microscope that makes possible more reliable and more reproducible monitoring of the light power level of the illuminating light beam arriving at a sample.

The present invention also provides a scanning microscope comprising an apparatus for ascertaining properties of a light beam that comprises a means for splitting a measured beam out from the light beam, at least one detector that at least partially receives the measured beam and a polarization-influencing means in the beam path of the measured beam.

The invention has the advantage that changes in the polarization and the light power level of the illuminating light beam can be reliably and efficiently detected, and thus compensated for or corrected, at the location of the sample.

A memory module is preferably provided, in which reference data, for example from calibration measurements, can be stored so that conclusions can be drawn from the measured properties of the measured beam as to the properties of the light beam, in particular at the location of the sample.

In a preferred embodiment, the polarization-influencing means is a linear polarization filter, arranged perpendicular to the optical axis of the measured beam and mounted rotatably about the optical axis, that preferably is rotated continuously about the optical axis by a motor. From the modulation of the signal on the detector or detectors, conclusions can then be drawn as to the degree of polarization of the light beam.

In another variant, the polarization-influencing means contains an LCD element that switches back and forth continuously between at least two polarization states. An electrooptical modulator (EOM) can also, for example, be provided as the polarization-influencing means. It is advantageous that no mechanically movable components are needed in this context.

In a preferred embodiment, a means for simultaneous color-selective detection of the measured beam is provided. The means preferably contains a spatially spectrally dividing element that is embodied, for example, as a prism. It can also, for example, be embodied as a grating, in particular as a transmission grating. In a very particularly preferred embodiment, one (in particular, coated) surface of the prism forms the beam splitter. The coating can be, for example, a partial mirror coating. A prism has the advantage that multiple reflections do not result in interference phenomena at the detector, since with a prism there are no parallel surfaces. Individual surfaces of the prism can be roughened in order to prevent reflections that, after multiple deflections within the prism, ultimately arrive at the detector and falsify the signal there.

Several individual detectors are preferably provided, each receiving spectrally different components of the measured light. The detector or the individual detectors can contain, for example, a photodiode or a photomultiplier or a photodiode row or a photodiode array or a CCD element or a photomultiplier array or a photomultiplier row. The individual detectors are preferably each individually calibrated for the wavelength that they receive.

In a particular embodiment, a processing module is provided that, as a function of at least one light power level measured with the monitoring detector, controls the output light power level of the light source or of individual lines of the light source.

In another preferred variant, a further polarization-influencing means, which holds the polarization at a reference value on the basis of the measured properties of the measured beam, is arranged in the beam path of the light beam. Advantageously provided therefore is a control circuit in which the apparatus for ascertaining is the measuring element and the polarization-influencing means is the adjusting element of the control circuit.

In a further variant, provision is made for correcting the image data obtained from the specimen, during or after the measurement, on the basis of the measured properties of the measured beam that are also, if applicable, logged over time.

In a preferred embodiment, an acoustooptical component that holds the light power level of the light beam constant on the basis of the measured properties of the measured beam is provided as the adjusting element of a control circuit. The acoustooptical component is preferably embodied as an acoustooptical tunable filter (AOTF) or an acoustooptical modulator (AOM). Acoustooptical filters are widely known, German Unexamined Application DE 197 13 254 or the previously mentioned German Unexamined Application DE 199 06 757 A1 being mentioned here merely by way of example. In acoustooptical filters (AOTFs), a mechanical wave is generated using an acoustic generator, for example a piezoelement, activated by an electromagnetic control frequency, and passes through the AOTF; a light wave can be diffracted or scattered at that wave. Ideally, acoustooptical filters are constructed in such a way that only the component having a wavelength corresponding to the control frequency is separated by diffraction from the rest of the incident light. The power level of the diffracted light can be adjusted by appropriate selection of the amplitude of the acoustic wave.

In a very particularly preferred embodiment, the scanning microscope is a confocal scanning microscope.

BRIEF DESCRIPTION OF THE DRAWINGS

The subject matter of the invention is depicted schematically in the drawings and will be described below with reference to the Figures, identical or identically functioning elements being labeled with the same reference characters. In the drawings.

DETAILED DESCRIPTION OF THE INVENTION

Figure 1:
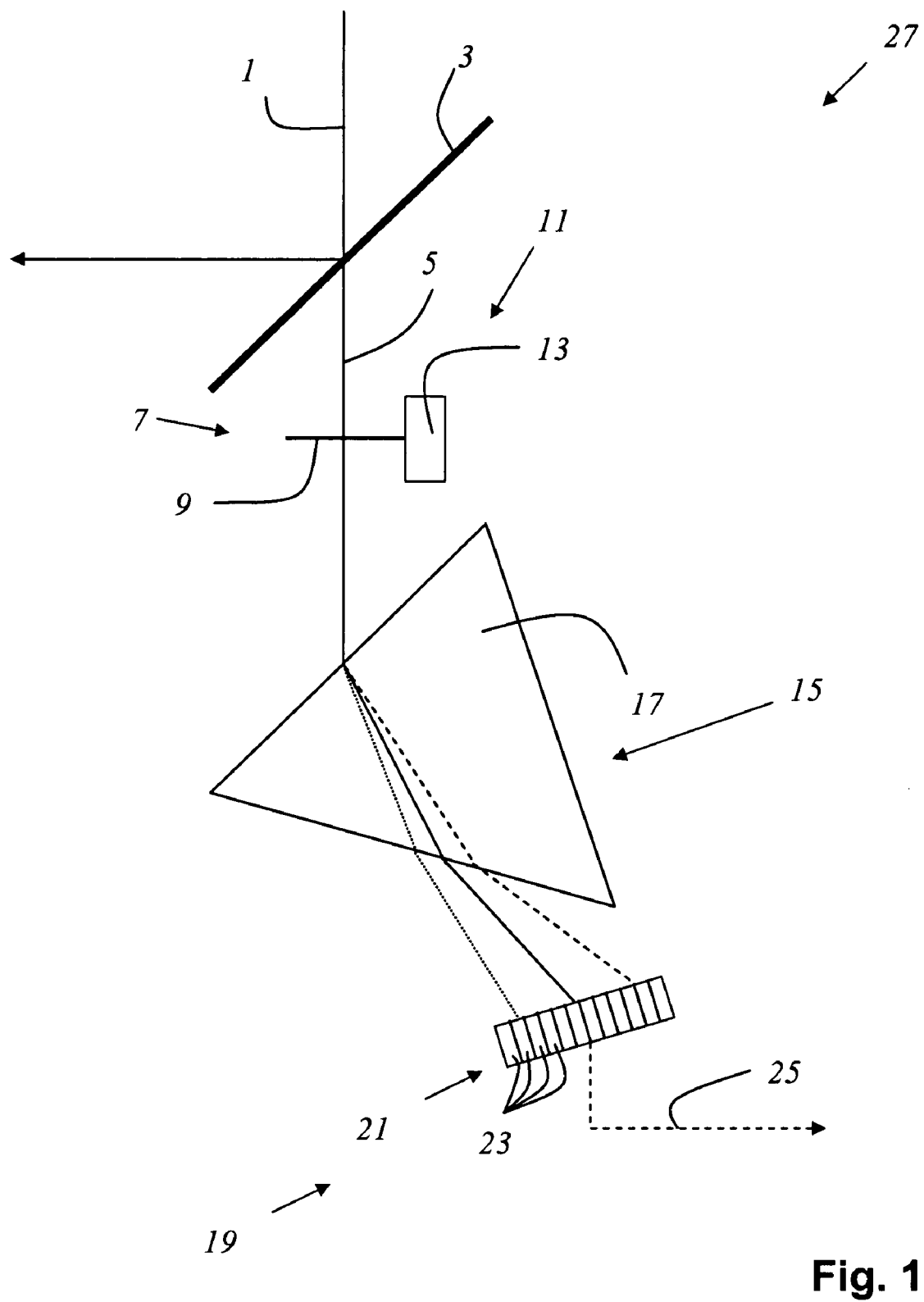
FIG. 1 shows an apparatus according to the present invention for ascertaining the properties of a light beam.

FIG. 1 shows an apparatus 27 according to the present invention for ascertaining the properties of a light beam 1. Using a beam splitter 3, a measured beam 5 whose light power level is a few percent of the light power level of light beam 1 is split out therefrom. The measured beam strikes a polarization-influencing means 7 that is embodied as a linear polarization filter 9. Polarization-influencing means 7 is arranged perpendicular to the optical axis of measured beam 5 and is mounted rotatably about the optical axis. The rotation is accomplished continuously with a drive means 11 that is embodied as a linear motor 13.

After passing through polarization-influencing means 7, measured beam 5 strikes a spatially spectrally dividing element 15 that is embodied as a prism 17, and then a detector 19 that is embodied as a photodiode row 21. Electrical signals proportional to the light power level of the respective spectral component are generated in the individual detectors 23 of photodiode row 21, and can be conveyed via conductor 25 to a processing module. From the modulation of the signals, conclusions can be drawn as to the degree of polarization of the light beam.

Figure 2:
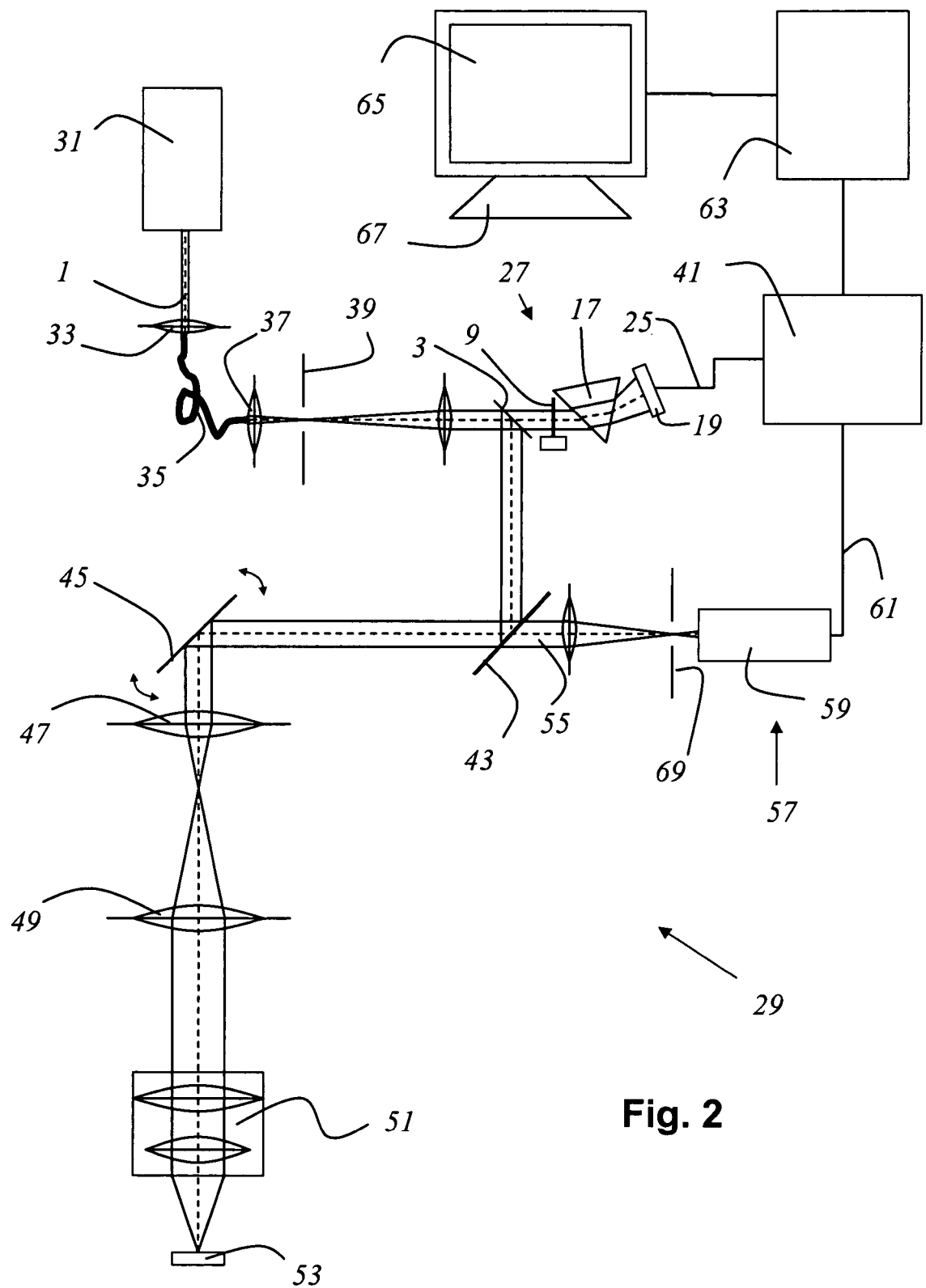
FIG. 2 shows a scanning microscope according to the present invention.

FIG. 2 schematically shows a scanning microscope 29 according to the present invention that is embodied as a confocal scanning microscope. Light beam 1 coming from an illumination system 31 is coupled into a glass fiber 35 using incoupling optical system 33; after being coupled out of glass fiber 35 by way of outcoupling optical system 37, it encounters illumination pinhole 39, passes through it, and arrives at an apparatus 27 for ascertaining the properties of a light beam 1, which apparatus is embodied analogously to that described in FIG. 1 so that the reader may be referred to that part of the description. The signals measured with detector 19 are transferred via conductor 25 to a processing unit 41, which calculates therefrom the light power levels of the individual lines and the polarization of light beam 1.

Light beam 1 travels via main beam splitter 43 to gimbal-mounted scanning mirror 45, which guides light beam 1 through scanning optical system 47, tube optical system 49, and objective 51, over or through sample 53. In the case of non-transparent samples 53, light beam 1 is guided over the sample surface. With biological samples 53 (preparations) or transparent samples, light beam 1 can also be guided through sample 53. This means that different focal planes of sample 53 can be successively scanned by light beam 1. Detected light 55 proceeding from sample 53 travels through objective 51, tube optical system 49, and scanning optical system 47 and via scanning mirror 45 to main beam splitter 43, passes through the latter, and encounters a detector apparatus 57 that is embodied as a multi-band detector 59. In detector apparatus 57, electrical detected signals proportional to the power level of detected light 55 are generated in spectrally selective fashion, and forwarded via conductor 61 to processing unit 41. In processing unit 41, the incoming analog signals are first digitized and then digitally correlated with one another, and corrected detected light power levels are ascertained on the basis of the signals of apparatus 27 for ascertaining the properties of light beam 1. Those power levels are forwarded to a PC 63. On the basis of a position signal of the gimbal-mounted mirror, the corrected detected light power levels are associated with the position of the pertinent scan point, and the data of all the scan points are assembled into an image 65 of sample 53 that is presented on a display 67. Illumination pinhole 39 and detection pinhole 69 that are usually provided in a confocal scanning microscope are schematically drawn in for the sake of completeness. Omitted in the interest of better clarity, however, are certain optical elements for guiding and shaping the light beams. These are sufficiently familiar to the person skilled in this art.

Figure 3:
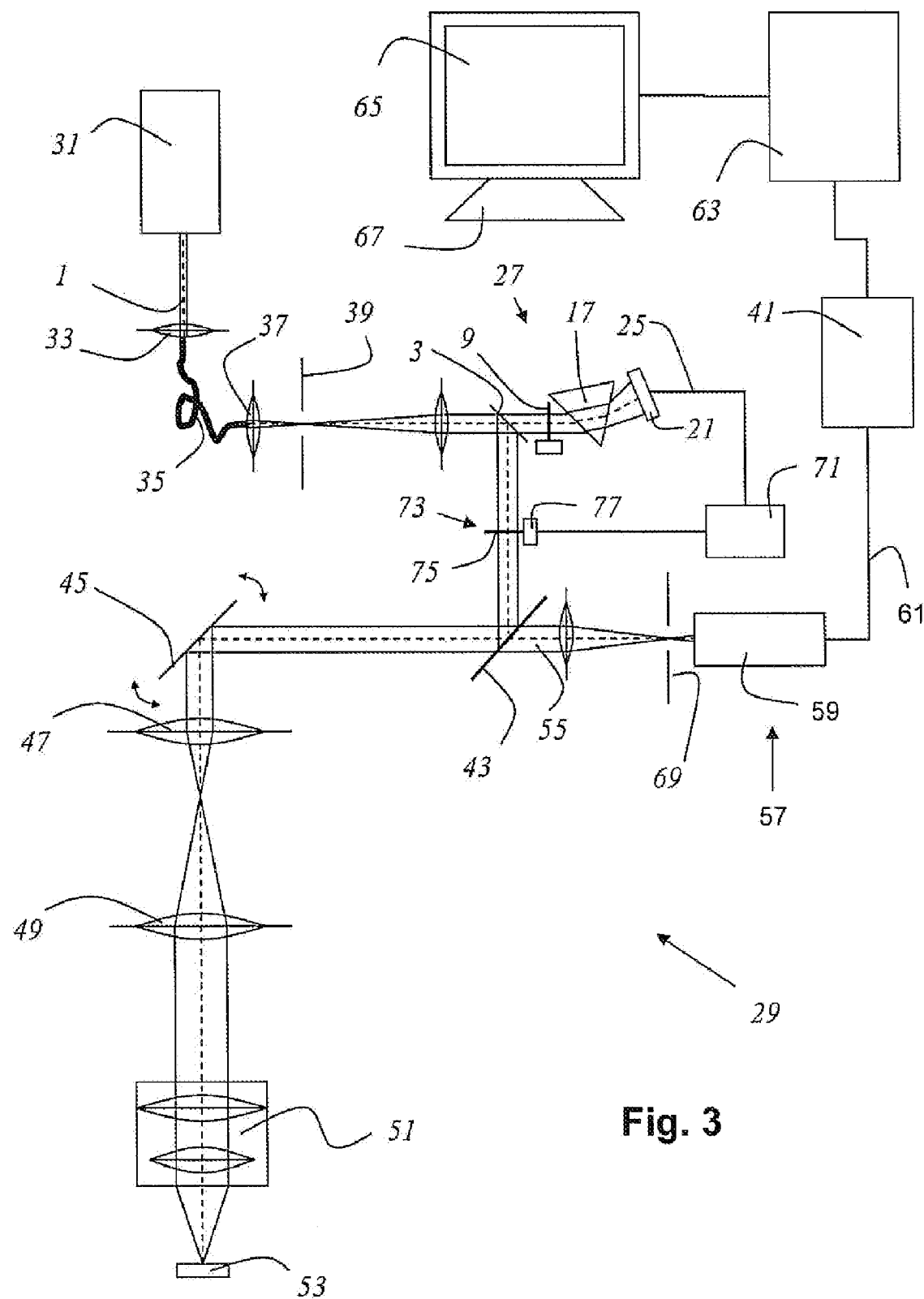
FIG. 3 shows a further scanning microscope according to the present invention.

FIG. 3 schematically shows a further scanning microscope 29 according to the present invention that is likewise embodied as a confocal scanning microscope. In this embodiment, the signals of apparatus 27 for ascertaining the properties of a light beam 1 are transferred via conductor 25 to a processing module 71 which, via a stepping motor 77, controls a further polarization-influencing means 73 that is embodied as a further linear polarization filter 75, and which holds the polarization of light beam 1 at a reference value on the basis of the measured properties of the measured beam. Further linear polarization filter 75 is arranged in the beam path of light beam 1.

The invention has been described with reference to a particular embodiment. It is self-evident, however, that changes and modifications can be made without thereby leaving the range of protection of the claims below.

What is claimed is:

1. An apparatus for ascertaining properties of a light beam, comprising:
    a beam splitting device for splitting a measured beam out from the light beam so as to provide an illuminating beam,
    at least one detector that at least partially receives the measured beam so as to measure at least one light power level,
    a polarizalion-influencing device in a beam path of the measured beam,
    a processing module that controls the polarization of the illuminating beam as a function of the at least one light power level measured with the detector, and
    a further polarization-influencing device in a beam path of the illuminating beam and operatively connected to the processing module for controlling the polarization of the illuminating beam as a function of the at least one light power level measured with the detector; and
    a device for simultaneous color-selective detection of the measured beam.

2. The apparatus as defined in claim 1, wherein the polarization-influencing device comprises a polarization filter and/or an LCD element and/or an electrooptical modulator (EOM).

3. The apparatus as defined in claim 1, wherein the polarization-influencing device is arranged rotatably.

4. The apparatus as defined in claim 3, wherein the polarization-influencing device is continuously rotatable.

5. The apparatus as in claim 3, further comprising a drive device for rotating the polarization-influencing device.

6. The apparatus as defined in claim 1, wherein the polarization-influencing device switches continuously between at least two polarization states.

7. The apparatus as defined in claim 1, wherein the means for simultaneous color-selective detection of the measured beam comprises a spatially spectrally dividing element.

8. The apparatus as defined in claim 1, wherein the at least one detector comprises several individual detectors, each receiving spectrally different components of the measured light.

9. A scanning microscope comprising an apparatus for ascertaining properties of a light beam, the apparatus comprising:
    a beam splitting device for splitting a measured beam out from the light beam so as to provide an illuminating beam at a sample so as to provide a detection beam, at least one detector that at least partially receives the measured beam so as to measure at least one light power level, at least one second detector that receives the detection beam, a polarization-influencing device in a beam path of the measured beam, a processing module that controls the polarization of the illuminating beam as a function of the at least one light power level measured with the detector, and a device for simultaneous color-selective detection of the measured beam.

10. The scanning microscope as defined in claim 9, wherein the polarization-influencing device comprises a polarization filter and/or an LCD element and/or an electrooptical modulator (EOM).

11. The scanning microscope as defined claim 9, wherein the polarization-influencing device is arranged rotatably.

12. The scanning microscope as defined in claim 11, wherein the polarization-influencing device is continuously rotatable.

13. The scanning microscope as defined in claim 11, further comprising a drive device for rotating the polarization-influencing device.

14. The scanning microscope as defined in claim 9, wherein the polarization-influencing device switches continuously between at least two polarization states.

15. The scanning microscope as defined in claim 9, wherein the device for simultaneous color-selective detection of the measured beam comprises a spatially spectrally dividing element, preferably a prism or a grating.

16. The scanning microscope as defined in claim 9, wherein several individual detectors are provided, each receiving spectrally different components of the measured light.

17. The scanning microscope as defined in claim 9, wherein the apparatus further comprises a further polarization-influencing device arranged in the beam path of the light beam and operatively connected to the processing module for controlling the polarization of the light beam as a function of the at least one light power level measured with the detector.

18. The scanning microscope as defined in claim 9, wherein an acoustooptical component is arranged in the beam path of the light beam as the adjusting element of a control circuit.

19. The scanning microscope as defined in claim 9, wherein image data obtained from the sample are correctable on the basis of measured properties of the measured beam.

20. A scanning confocal microscope comprising an apparatus for ascertaining properties of a light beam, the apparatus comprising:

a beam splitting device for splitting a measured beam out from the light beam so as to provide an illuminating beam at a sample so as to provide a detection beam, at least one detector that at least partially receives the measured beam so as to measure at least one light power level, at least one second detector that receives the detection beam, a polarization-influencing device in a beam path of the measured beam, a processing module that controls the polarization of the illuminating beam as a function of the at least one light power level measured with the detector, and a device for simultaneous color-selective detection of the measured beam.

\* \* \* \* \*